(12) United States Patent
Boudoux

(10) Patent No.: US 11,216,056 B2
(45) Date of Patent: Jan. 4, 2022

(54) POWER SUPPLY UNIT FOR AN ELECTRONIC DEVICE

(71) Applicant: Aptiv Technologies Limited, St. Michael (BB)

(72) Inventor: Emmanuel Boudoux, Cologne (DE)

(73) Assignee: Aptiv Technologies Limited, St. Michael (BB)

( * ) Notice: Subject to any disclaimer, the term of this patent is extended or adjusted under 35 U.S.C. 154(b) by 160 days.

(21) Appl. No.: 16/208,686

(22) Filed: Dec. 4, 2018

(65) Prior Publication Data

US 2019/0187772 A1 Jun. 20, 2019

(30) Foreign Application Priority Data

Dec. 20, 2017 (EP) .................................... 17209136

(51) Int. Cl.

| | | |
|---|---|---|
| *G06F 1/32* | (2019.01) | |
| *G06F 1/30* | (2006.01) | |
| *G06F 1/3234* | (2019.01) | |
| *H02M 3/158* | (2006.01) | |
| *G06F 1/28* | (2006.01) | |
| *G05F 1/46* | (2006.01) | |
| *H02J 1/08* | (2006.01) | |
| *H02M 1/36* | (2007.01) | |

(52) U.S. Cl.
CPC ............ *G06F 1/3243* (2013.01); *G05F 1/465* (2013.01); *G06F 1/28* (2013.01); *G06F 1/30* (2013.01); *H02J 1/08* (2013.01); *H02M 1/36* (2013.01); *H02M 3/158* (2013.01); *H02J 1/082* (2020.01)

(58) Field of Classification Search
CPC ..................................... G06F 1/32; G06F 1/26
See application file for complete search history.

(56) References Cited

U.S. PATENT DOCUMENTS

| | | | | |
|---|---|---|---|---|
| 5,559,376 | A * | 9/1996 | Tachikawa | ................ H02J 1/10 307/18 |
| 5,909,095 | A * | 6/1999 | Sakti | ....................... H02P 6/182 318/400.35 |
| 7,003,748 | B1 * | 2/2006 | Hsu | ....................... G06F 30/394 716/120 |
| 7,342,328 | B1 * | 3/2008 | Eddleman | ................. H02J 1/10 307/80 |
| 9,252,563 | B1 * | 2/2016 | Delage | .................. H01S 5/0427 |

(Continued)

OTHER PUBLICATIONS

"Foreign Office Action", CN Application No. 201811547359.5, dated Jun. 23, 2020, 14 pages.

(Continued)

*Primary Examiner* — Phil K Nguyen
(74) *Attorney, Agent, or Firm* — Colby Nipper PLLC

(57) ABSTRACT

A power supply unit for an electronic device includes an input section comprising input terminals connectable to a primary power source, an output section comprising output terminals connectable to the electronic device and outputting at least two secondary voltages having different nominal voltage levels, and a power management section. The power management section is configured to perform a shutdown process upon existence of a shutdown criterion, wherein the emergency shutdown process comprises decreasing each of the secondary voltages down to a predetermined safety level in a controlled manner.

20 Claims, 7 Drawing Sheets

(56) References Cited

U.S. PATENT DOCUMENTS

| | | | |
|---|---|---|---|
| 10,504,434 B2* | 12/2019 | Choi | G09G 3/3258 |
| 2001/0010639 A1* | 8/2001 | Shirato | H02M 3/28 |
| | | | 363/89 |
| 2004/0008015 A1* | 1/2004 | Pons | G05F 1/56 |
| | | | 323/274 |
| 2004/0100807 A1* | 5/2004 | MacDonald | G06F 1/263 |
| | | | 363/142 |
| 2004/0130302 A1 | 7/2004 | Ostojic | |
| 2005/0117376 A1* | 6/2005 | Wilson | G06F 1/263 |
| | | | 363/142 |
| 2005/0210346 A1* | 9/2005 | Comaschi | G06F 1/3203 |
| | | | 714/724 |
| 2006/0041770 A1* | 2/2006 | Lougee | G06F 1/30 |
| | | | 713/340 |
| 2006/0198173 A1* | 9/2006 | Rozman | H03K 17/08122 |
| | | | 363/123 |
| 2007/0001514 A1* | 1/2007 | Marshall | H02J 1/102 |
| | | | 307/28 |
| 2009/0085902 A1* | 4/2009 | Yamamoto | G09G 3/3648 |
| | | | 345/211 |
| 2010/0117450 A1 | 5/2010 | Azrai et al. | |
| 2011/0068751 A1* | 3/2011 | Lin | H02M 1/126 |
| | | | 320/166 |
| 2011/0163695 A1* | 7/2011 | Schmid | H02J 1/14 |
| | | | 315/307 |
| 2012/0153992 A1 | 6/2012 | Nogawa | |
| 2016/0054788 A1* | 2/2016 | Gulati | G06F 1/3209 |
| | | | 713/323 |
| 2017/0012529 A1* | 1/2017 | Yamada | H02M 3/158 |
| 2018/0278180 A1* | 9/2018 | Toyoda | H02J 9/062 |

OTHER PUBLICATIONS

"Foreign Office Action", CN Application No. 201811547359.5, dated Feb. 8, 2021, 7 pages.

"Foreign Office Action", EP Application No. 17209136.5, dated Oct. 22, 2020, 6 pages.

"Foreign Office Action", EP Application No. 17209136.5, dated Apr. 30, 2021, 6 pages.

* cited by examiner

POWER SUPPLY UNIT FOR AN ELECTRONIC DEVICE

TECHNICAL FIELD OF INVENTION

The present invention relates to a power supply unit for an electronic device, in particular for a microprocessor, the power supply unit having an input section comprising input terminals connectable to a primary power source, the primary power source outputting a primary voltage, an output section comprising output terminals connectable to the electronic device and outputting at least two secondary voltages having different nominal voltage levels.

BACKGROUND OF INVENTION

Electronic devices such as microprocessors, network switches, field programmable gate arrays and the like usually need to be supplied with several different direct-current voltages for a proper operation. For example, an electronic device may include a 3V input, a 1.5V input and a 1.2V input. A power supply unit for such devices receives a primary voltage from a battery or a power network and transforms the primary voltage into a plurality of secondary voltages. Usually, each of the secondary voltages is less than the primary voltage. Exemplary levels of the primary voltage are 5V, 12V, 24V and 48V.

It is noted that an electronic device may be connected to a staged series of power supply units, wherein at least one power supply unit of the series is configured as described in the present disclosure.

During a system launch process, the secondary voltages should be turned on sequentially, starting with the voltage having the highest nominal level. During a system shutdown process, the secondary voltages should not "cross" each other, i.e. a secondary voltage having a higher nominal level should always be higher or equal than a secondary voltage having a lower nominal level. If this requirement is not met, the integrated circuits of the electronic device may be damaged. In current power-supply units it is difficult to reliably ensure that the predetermined turnoff sequence is maintained at any time. Also, current turnoff sequences may require a long period of time. These problems are particularly severe when microprocessors are to be installed on cars, because electrical vehicle power networks tend to have relatively frequent and abrupt voltage drops.

SUMMARY OF THE INVENTION

Described herein is a power supply unit which protects an electronic device connected thereto from damages even in case of a sudden loss of the primary voltage.

In accordance with the invention, the power management section is configured to perform a shutdown process upon existence of a shutdown criterion, wherein the shutdown process comprises decreasing each of the secondary voltages down to a predetermined safety level in a controlled manner.

Particularly, the secondary voltages are not simply turned off, but actively decreased or pulled down in a controlled manner. Consequently, it is not necessary to provide safety time intervals between subsequent voltage turnoff processes. Thus, the shutdown process is particularly fast. Due to the control of the falling edges of the secondary voltages, it can be ensured that the predefined turnoff sequence is met under any circumstances. The invention therefore enhances the safety for electronic devices.

Advantageously, electric energy of the primary power source is input into the power supply unit using the input terminals. The output terminals can output the secondary voltages; wherein preferably different secondary output voltages are output at different output terminals.

Advantageous embodiments of the invention can be seen from the dependent claims, from the following description and the appended figures.

The shutdown criterion may be the receipt of a regular shutdown command, for example from an external device or a user interface. However, according to a preferred embodiment of the invention, the power supply unit comprises a voltage supervisor section connected to the power management section, the voltage supervisor section being configured to detect a loss of the primary voltage and to output a power loss signal upon detecting a loss of the primary voltage, wherein the shutdown process is an emergency shutdown process to be performed by the power management section upon receipt of a power loss signal from the voltage supervisor section. Particularly, the existence of the power loss signal can be a shutdown criterion.

The power management section is preferably configured to decrease the secondary voltages during the shutdown process such that, before the secondary voltages have reached the safety level, the actual level of the secondary voltage having the higher nominal voltage level is always equal or greater than the actual level of the secondary voltage having the lower nominal voltage level. Thus, undesired voltage "crossings" which may be the cause for damages of the connected electronic circuits are avoided. When the safety level has been reached, it is not necessary to further control the decreases of the individual voltages, because the crossing of very low voltages is not dangerous for electronic circuits. Dependent on the application, a further control until a voltage level of zero may be provided nevertheless.

The power loss signal is preferably generated if a reduction of the primary voltage below a predetermined level is detected. For example, the power loss signal can be generated if a reduction of the primary voltage of more than 10%, more than 20%, more than 50% or more than 70% is detected. In addition, the power loss signal is preferably only generated if the reduction of the primary voltage below the predetermined level lasts longer than a predetermined temporal threshold, e.g. longer than 10 µs, longer than 100 µs or longer than 1 ms or 10 ms.

The power management section can be configured to control the decrease of the secondary voltages during the shutdown process according to respective predetermined temporal courses. The predetermined temporal courses can e.g. be provided by graphs indicating a desired decrease of the respective secondary voltages. Thus, the voltage levels of all secondary voltages are known at any time during the shutdown process. Therefore, voltage crossings can be avoided even in case of temporally overlapping decreases.

Preferably, the predetermined temporal courses are at least essentially linear courses. This enables a relatively easy implementation.

In accordance with an embodiment of the invention, the power management section is configured (at least at a predetermined amount of time or at all times) to simultaneously decrease the secondary voltages during the shutdown process. Such a simultaneous decrease is considerably faster than a sequential decrease.

In particular, the power management section may be configured to simultaneously start with the decreasing of the secondary voltages and/or to decrease the secondary voltages during the shutdown process such that they simultaneously reach the safety level. The time for a complete shutdown is thus minimized. In case of a linear decrease of the secondary voltages with a common start and a common arrival at the safety level, voltage crossings are excluded.

In principle, the power management section may be configured to decrease, during the shutdown process, the secondary voltage having a lower nominal voltage down to the safety level and only after that to start with decreasing the secondary voltage having the higher nominal voltage. This embodiment is simple to implement. Although such a shutdown process is principally sequential, it is faster than a shutdown process involving fixed safety time intervals between the individual turnoff steps.

For example, decreasing the secondary voltages can be performed using pull-down means. The pull-down means can comprise a switch (e.g. a transistor) connected to at least one of the output terminals, wherein the switch can pull the voltage level at the output terminal to a predefined voltage level (e.g. ground). The pull-down means can also comprise a resistor connected in series with the switch. The value of the resistor can then be used to adjust the speed in which the respective secondary voltage is decreased. Advantageously, each output terminal is connected to separate pull-down means. In this case, during the emergency shutdown process, the switches can be closed one after another. Firstly, the switch connected to the output terminal with the lowest nominal secondary voltage is closed. Then the switch connected to the output terminal with the second lowest nominal secondary voltage is closed. This process is repeated until the switch connected to the highest nominal secondary voltage is closed. The decreasing speed can be calculated in advance. The time intervals between the closing of the respective switches can be predetermined and can be stored in a memory of the power management unit. It is possible to decrease some or all secondary voltages simultaneously. Thereby, a controlled and fast decrease of the secondary voltages can be achieved.

In accordance with another embodiment of the invention, the shutdown process comprises decreasing the secondary voltages gradually applying individual decrements. The amount of the decrements can be selected sufficiently low to exclude voltage crossings. A gradual decrease is especially easy to implement, because a feedback loop is not necessary. In case the power supply unit includes DC-DC-converters, a pre-programmed stepwise reduction of the duty cycles of the DC-DC-converters can be carried out to decrease the secondary voltages.

Preferably, the power supply unit comprises separate DC-DC-converters for each of the secondary output voltages. In other words, exactly one DC-DC-converter is connected with exactly one output terminal. Some or all the DC-DC-converters can comprise a voltage sensor which determines the voltage outputted by the respective DC-DC-converter (i.e. the respective secondary voltage). The voltage sensor may comprise a resistor based voltage divider. In principle, the power supply unit may comprise a common DC-DC-converter for at least two of the secondary output voltages.

The DC-DC-converters of the power supply may be buck-converters, i.e. step-down converters which step down voltage. The use of buck-boost-converters or synchronous boost-converters is also possible.

The power management section may be configured to re-inject current, in particular from the output section, to the voltage sensor in order to decrease the secondary voltages during the shutdown process. Apart from the output section, a separate current source may provide the re-injected current. By such a re-injection, a higher output voltage level than actually present is pretended to the corresponding DC-DC-converter, resulting in a reduction of the secondary voltage. In other words, the DC-DC-converter is made to believe that the secondary voltage is greater than it should be. The DC-DC-converter will then decrease the secondary voltage. A steering or control of the secondary voltages can thus be achieved. This process is particularly of advantage for analogue DC-DC-converters. For digital DC-DC-converters, a counter could be used to decrease the pulse width at each step or at every n steps, n being a natural number.

In accordance with another embodiment of the invention, the shutdown process comprises decreasing the secondary voltages in a feedback controlled manner. In other words, the power management unit can monitor the secondary voltages and can comprise a control loop, wherein the control loop allows a controlled reduction of the secondary voltages. Particularly, the power management unit can comprise a control loop for each secondary voltage. Such a shutdown process is particularly safe and reliable.

The power supply unit may be configured to allow for a reverse energy transfer to the input section during the shutdown process.

In particular, the power supply unit may include a plurality of DC-DC-converters having respective energy storages, in particular coils, wherein the power management section is configured to decrease the secondary voltages sufficiently fast to allow for a reverse energy transfer from the energy storages to the input section. If the respective secondary voltage cannot decrease as fast as it is defined by the variation of the duty cycle, the current in the coil reverses. Thereby, a buck converter can become a boost converter (with reversed direction of flow of electric energy). Thus, electrical energy is transferred back to the input section (e.g. to the input terminals) and the primary voltage is stabilized—at least for a short period of time such as for approximately 100 microseconds ($\mu$s). This additional time provided by the energy recuperation is advantageous in terms of a safe shutdown process.

To allow electrical energy to be transferred back to the input section, the DC-DC-converters may not comprise a diode. The diode usually used in DC-DC-converters can be replaced by a switch. The DC-DC-converters used in the power supply unit can have a first switch (e.g. a transistor) connected between the primary voltage and a first connector of a coil. A second connector of the coil can be connected to (or form) an output terminal. To the first connector of the coil a second switch is connected which can selectively establish a connection with a reference potential (e.g. ground). Between the reference potential and the second connector of the coil a capacitor can be placed. When electrical energy is to be transferred back to the input section, the first switch can be closed (conducting), whereas the second switch can be open (not conducting).

The power supply unit can be an analogue power supply unit, wherein the power management section is configured to decrease the secondary voltages during the shutdown process by means of a current injection at the output section. The current injection can be carried out at a voltage measuring section of the output section. In particular, the output section can include a voltage divider having two resistors to control the output voltage. By injecting a controlled current between the two resistors, i.e. in the middle of the voltage divider, the output voltage can be decreased in a simple and predictable manner (as explained above). The course of the rising injection current defines the course of the falling secondary voltage.

Alternatively, the power supply unit may be a digital power supply unit having a plurality of DC-DC-converters respectively providing the secondary voltages, wherein the power management section is configured to decrease the secondary voltages during the shutdown process by reducing respective duty cycles of the DC-DC-converters. This provides for an especially simple implementation.

Digital power supply units usually include DC-DC-converters which use a switching technique. Such DC-DC-converters convert one voltage level to another voltage level by storing the input energy temporarily and then releasing that energy to the output at a different voltage. The storage can include magnetic field storage components such as inductors and transformers or electric field storage components such as capacitors. A preferred technique to control the output voltage is the method of pulse-width modulation (PWM), wherein the average voltage level is controlled by turning a switch between supply and load on and off at a fast rate. The longer the switch is on compared to the off periods, the higher is the output voltage. The proportion of 'on' time to the regular interval of time is called "duty cycle". A low duty cycle corresponds to a low output power. In particular digital controls can easily set the needed duty cycle.

Particularly, a predetermined temporal course of reducing the respective duty cycles of the respective DC-DC-converters is stored in a memory of the power management section. During the shutdown process, the temporal course of the stored duty cycles is used to decrease the secondary voltages. Alternatively, it is also possible to use the above-mentioned feedback/control loop. In response to the secondary voltage (e.g. measured by the control loop), the duty cycle of the respective DC-DC-converter can be changed in order to control the respective secondary voltage and to achieve the predetermined temporal course of the respective secondary voltage.

According to a further embodiment of the invention, the safety level is greater than 0 mV and less than 500 mV, preferably greater than 0 mV and less than 300 mV or 200 mV. It is not necessary to decrease the secondary voltages down to zero in a controlled manner, because damages to electronic circuits due to voltage crossings are only to be expected if the voltages are above a threshold level. The shutdown process is faster if a safety level of more than zero is selected. Moreover, the voltage regulator remains in a completely operable state if the corresponding secondary voltage is not controlled down to zero. Also, a reverse energy transfer as mentioned above can only occur if there is still energy at the output, i.e. if the secondary voltage is greater than zero.

The voltage supervisor section and the power management section can be formed within respective integrated circuits. Preferably, however, the voltage supervisor section and the power management section are formed within a common integrated circuit. This provides for an especially compact and lightweight construction.

The above mentioned object is also satisfied by a microprocessor system having a microprocessor and a power supply unit connected to the microprocessor, wherein the power supply unit is configured as specified above. Such a microprocessor system is particularly suitable for automotive applications where occasional losses of the battery voltage are to be expected.

The invention also relates to a method for carrying out a shutdown of an electronic device connected to a power supply unit, wherein the power supply unit receives a primary voltage and outputs at least two secondary voltages having different nominal voltage levels to the electronic device.

In accordance with the invention, the primary voltage is monitored. If a loss of the primary voltage is detected, each of the secondary voltages is decreased down to a predetermined safety level in a controlled manner.

Such a method can in particular be carried out by means of a power supply unit as specified above.

Preferably, the secondary voltages are decreased simultaneously.

The invention also relates to an automotive vehicle having an electrical vehicle power network and a power supply unit as described above. The power supply unit is connected to the vehicle power network and uses the vehicle power network as primary power source. The automotive vehicle further comprises a microprocessor which is electrically connected to the output terminals of the power supply unit and which is supplied with electrical energy by the power supply unit.

The disclosure with reference to the inventive power supply unit is also true for the inventive method, the inventive microprocessor system and the inventive automotive vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

Subsequently, the present invention is explained in more detail based on an exemplary embodiment with reference to the accompanying figures, wherein.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
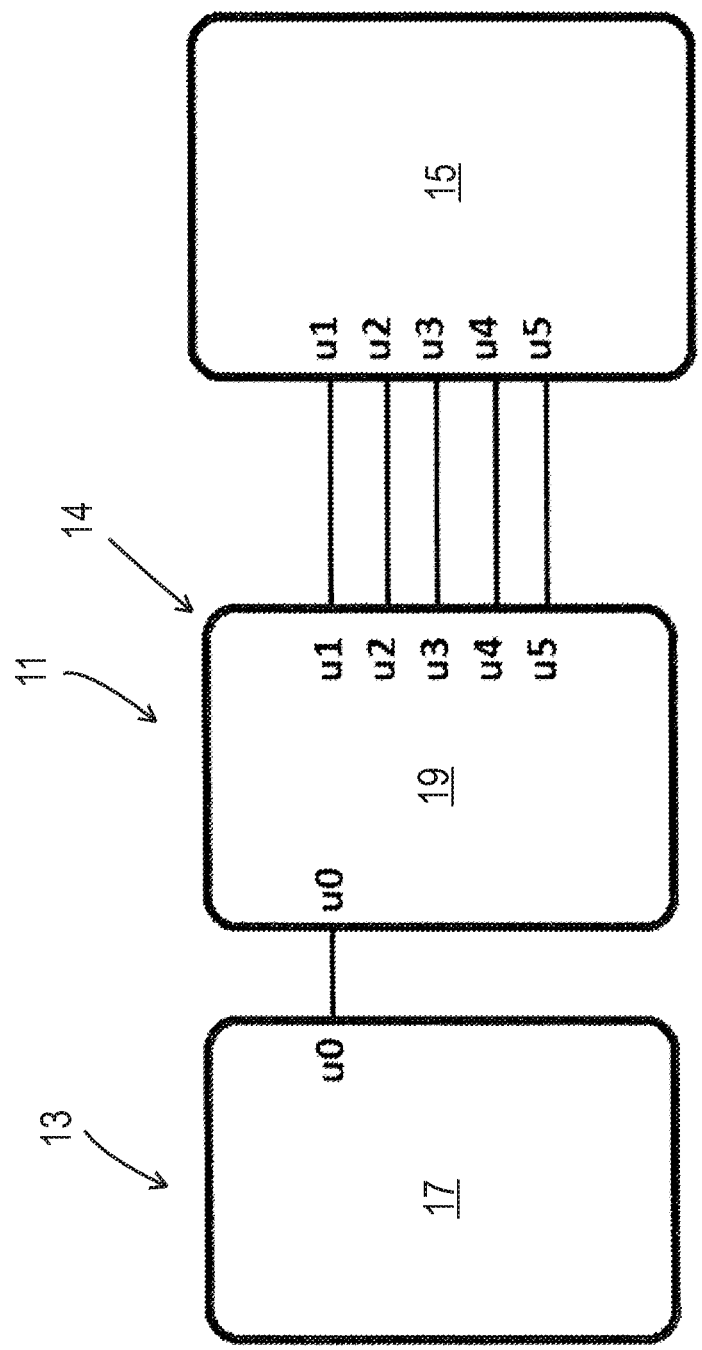
FIG. 1 is a schematic representation of a microprocessor system according to the prior art.

In FIG. 1, there is shown a power supply unit 11 according to the prior art. The power supply unit 11 comprises an input section 13 and an output section 14. The input section 13 is connected to a primary power source such as a battery, not shown. The output section 14 is connected to a microprocessor 15. At the input section 13, a pre-regulator 17 transforms the primary voltage outputted by the primary power source to an input voltage u0. For example, the input voltage u0 can be 5V. A power management section 19 of the power supply unit 11 receives the input voltage u0 and generates a plurality of secondary voltages u1-u5 having different nominal voltage levels. The power management section 19 can include a smart supply circuit.

Figure 2:
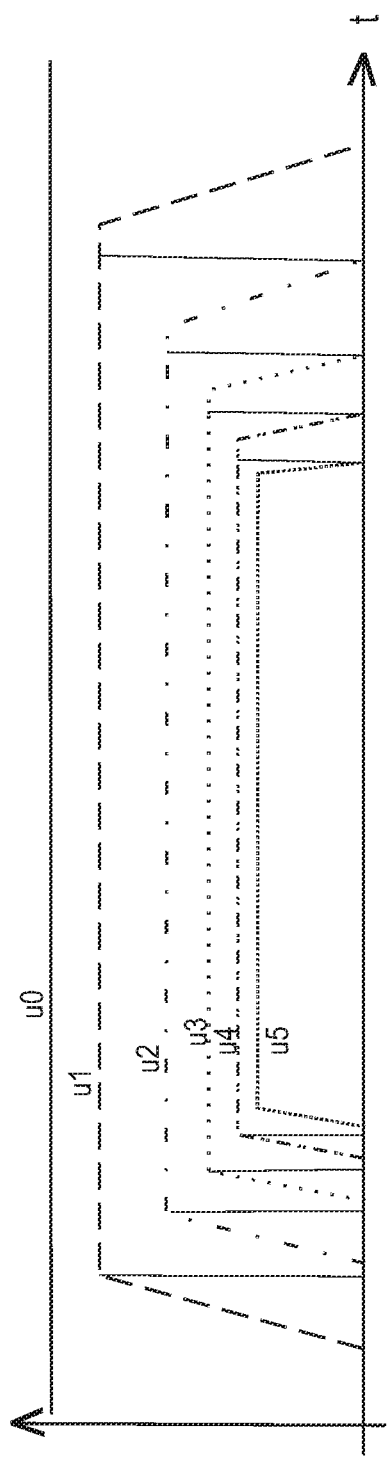
FIG. 2 is a diagram to illustrate a system launch process and a system shutdown process of the microprocessor system shown in FIG. 1.

During a system launch, the secondary voltages u1-u5 are turned on one after the other according to a controlled sequence, as shown in the left part of FIG. 2. In particular, the highest secondary voltage u1 is the first one to be started. Only after u1 has reached its target value, the next lower voltage u2 is allowed to start rising. This procedure continues until the lowest secondary voltage u5 has reached its target value. After then, the microprocessor 15 is allowed to run.

During a system shutdown, the secondary voltages u1-u5 should be turned off in reverse order, as shown in the right part of FIG. 2. In order to avoid potential damages of the semiconductor circuits of the microprocessor 15, it is important that the relation u1>u2>u3>u4>u5 is fulfilled at any time during the shutdown process. Two respective secondary voltages may also be equal.

Figure 3:
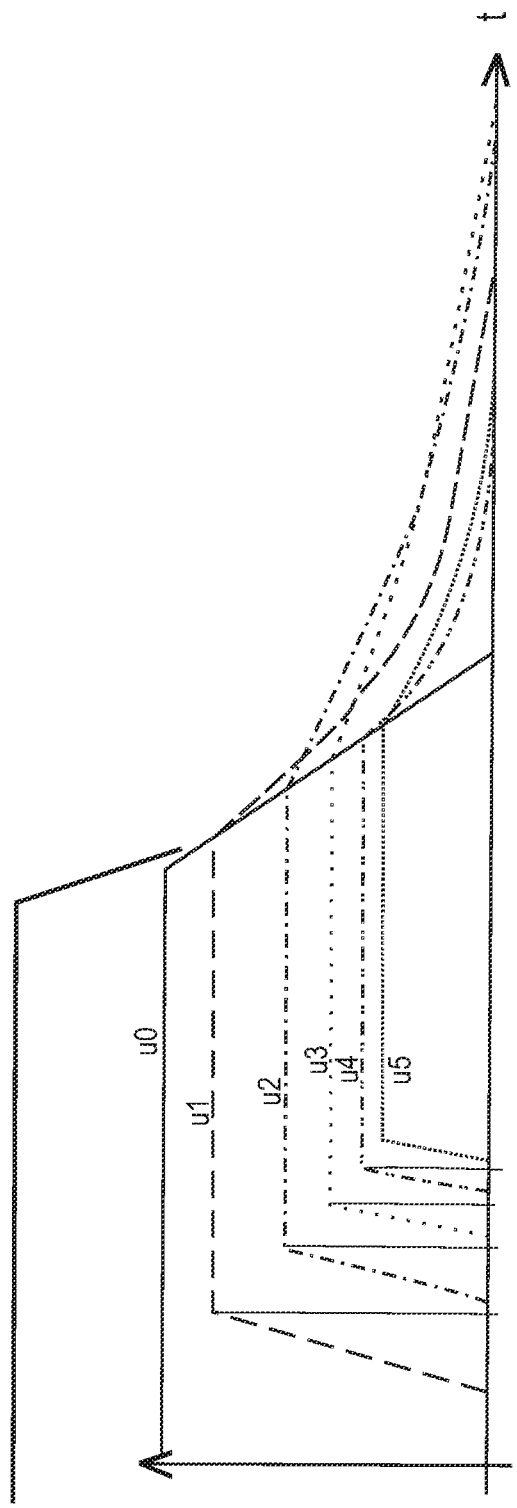
FIG. 3 illustrates a crossing of the courses of the secondary voltages which may occur in the system according to FIG. 1 as a consequence of a sudden loss of the primary voltage.

In particular if the primary power source is a car battery or a vehicle power network, it is possible that the primary voltage is lost. If the pre-regulator 17 loses its supply, it is not able to maintain the input voltage u0. The power management section 19 can then run a power-down sequence for the microprocessor 15. However, a power-down sequence as shown in the right part of FIG. 2 needs a considerable amount of time. Often, the drop of the input voltage u0 is too fast for the implementation of a regular shutdown sequence. In this case, voltage crossings as shown in FIG. 3 may occur. Such voltage crossings (where u1>u2>u3>u4>u5 is not fulfilled anymore) can damage the microprocessor 15 and have to be avoided under all circumstances.

Figure 4:
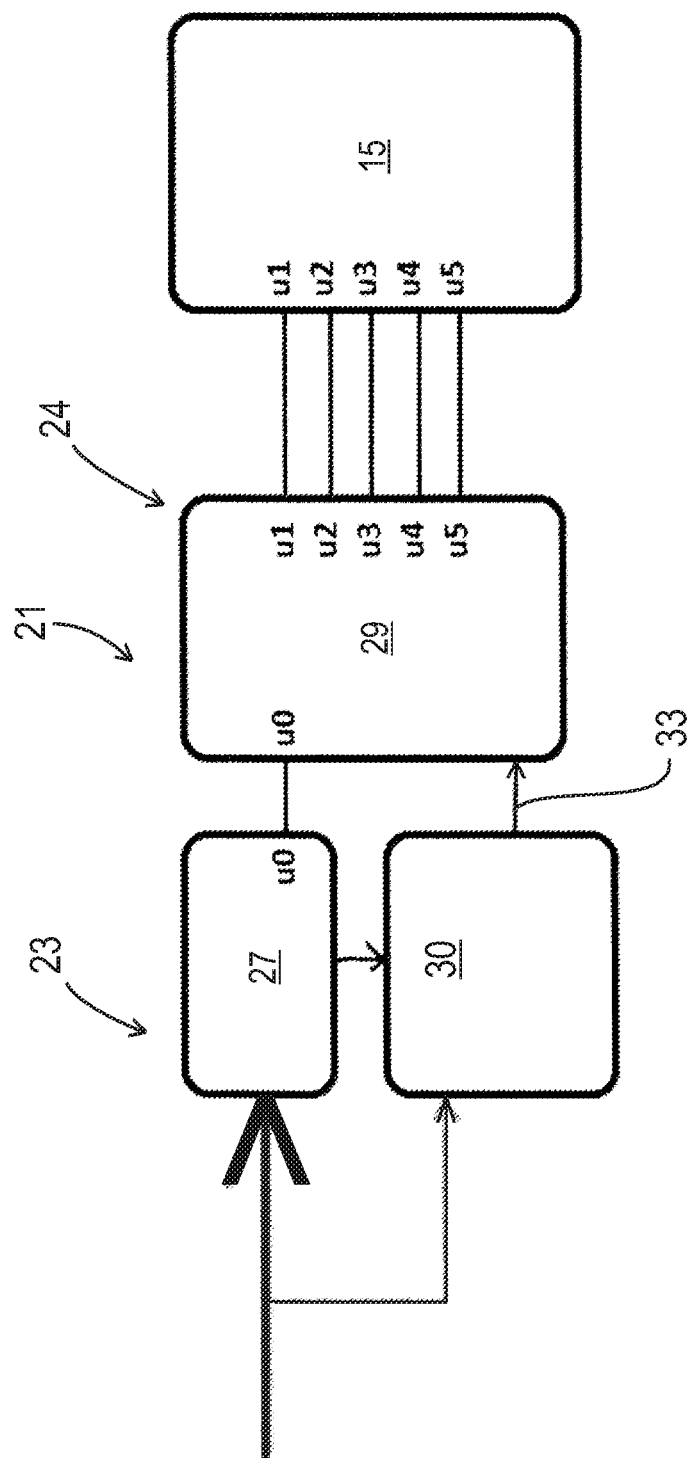
FIG. 4 is a schematic representation of a microprocessor system according to an embodiment of the invention.

FIG. 4 shows a power supply unit 21 which is configured in accordance with the invention. Like the power supply unit 11 according to FIG. 1, the power supply unit 21 shown in FIG. 4 comprises an input section 13 connected to a primary power source and an output section 14 connected to a microprocessor 15. Further, the power supply unit 21 comprises a pre-regulator 27 transforming the primary voltage to an input voltage u0 as well as a power management section 29 which preferably includes a smart supply circuit. The power supply unit 21 receives the input voltage u0 and generates a plurality of secondary voltages u1-u5 having different nominal voltage levels.

A voltage supervisor section 30 of the power management section 29 is connected to the pre-regulator 27 and to the power management section 29. The voltage supervisor section 30 is configured to detect a loss of the primary voltage and to output a power loss signal 33 upon detecting a loss of the primary voltage. It is preferred that the pre-regulator 27, the voltage supervisor section 30, and the power management section 29 are formed within a common integrated circuit.

Upon receipt of a power loss signal 33 from the voltage supervisor section 30, the power management section performs an emergency shutdown process as specified below with reference to FIG. 5.

During the emergency shutdown process, each of the secondary voltages u1-u5 is decreased down to a predetermined safety level 35 in a controlled manner, preferably in a feedback controlled manner. The decreasing of the secondary voltages u1-u5 is carried out simultaneously instead of sequentially. In particular, the decreasing of the secondary voltages u1-u5 is started simultaneously and is controlled such that the secondary voltages u1-u5 exhibit a linear decline until they simultaneously reach the safety level 35. Due to the simultaneous decrease of the secondary voltages u1-u5, the emergency shutdown process can be carried out especially fast. An undesired voltage crossing is excluded since the decreases are actively controlled and follow predefined temporal courses.

Moreover, energy can be transferred from the output section 14 back to the pre-regulator 17 resulting in a short-term stabilization 36 of the input voltage u0. Such a short-term stabilization 36 provides more time for the controlled shutdown process, for example approximately 0.1 ms. Thus, the temporal safety margin is increased.

It is possible, but not necessary that the safety level 35 is zero. Preferably, the safety level 35 is slightly below a body diode voltage level. For instance, the safety level 35 can be targeted to 150 mV to provide a safety margin to the 300 mV threshold of a customary Schottky diode. Below the safety level 35, there is no danger for destructive energy pulses, even if voltage crossings occur.

Figure 6:
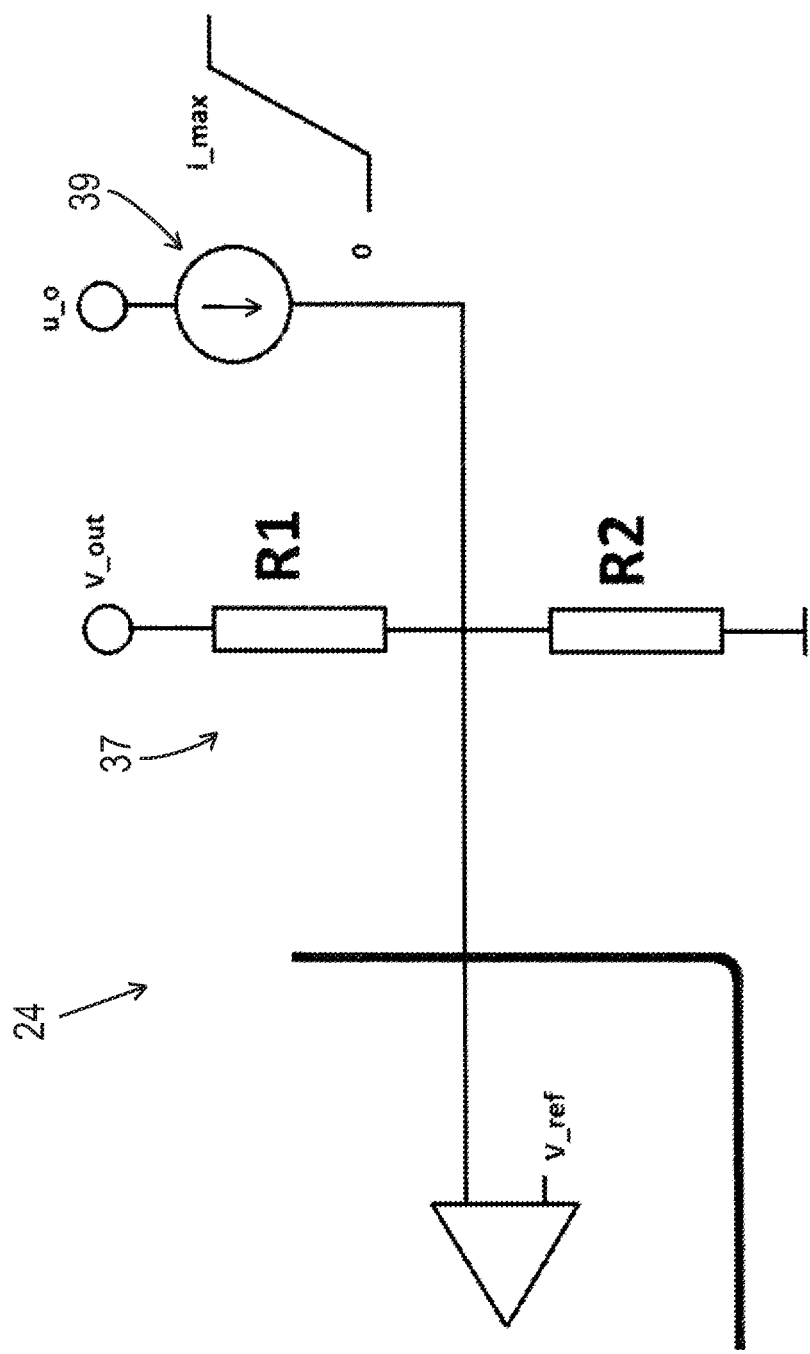
FIG. 6 is a connection diagram showing an output section of the power supply unit of the microprocessor system according to FIG. 4.

This simultaneous decrease of the secondary voltages u1-u5 can be monitored either by a digital control or by an analogue control. An exemplary way to perform an analogue control is shown in FIG. 6. A resistor based voltage divider 37 comprising a first resistor R1 and a second resistor R2 is provided at the output section 24. To control the output voltage, a controlled current provided by a controllable current source 39 is injected between the resistors R1, R2. The temporal course of the decreasing output voltage can be fully controlled via the current source 39. In order to keep the regulating arrangement in an operable state, it is preferable not to try to decrease the output voltage down to zero.

Figure 7:
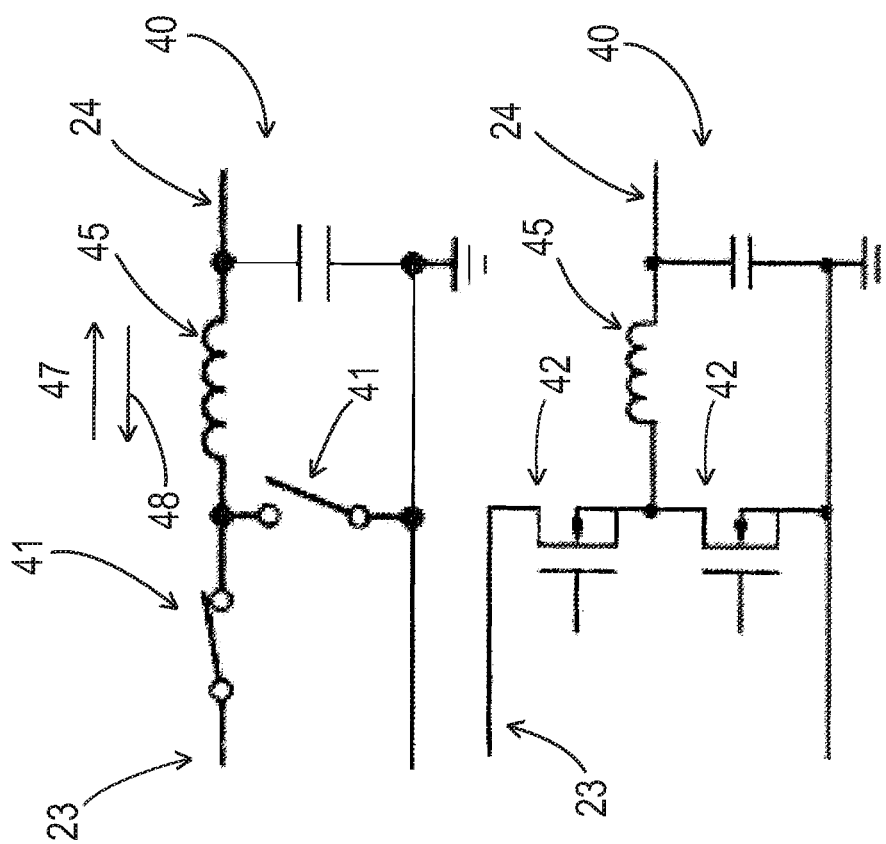
FIG. 7 is a connection diagram showing a voltage converter section of the power supply unit of the microprocessor system according to FIG. 4.

The power management section 29 can include DC-DC-converters 40 as shown in FIG. 7. Each of the DC-DC-converters 40 comprises a switching element 41, 42 and a coil 45 to store energy. During the regular operation, the DC-DC-converters 40 operate as buck converters and electrical energy is transferred from the input section 23 to the output section 24 as shown by arrow 47. If, however, the output voltage cannot decrease as fast as the variation of the duty cycle orders it, the current in the coils 45 reverses as shown by arrow 48. Energy is then transferred to the input section 23 resulting in a stabilization 36 (FIG. 5) of the input voltage u0. Therefore, a reverse current should not be blocked. To avoid blockage of reverse current, a diode could be omitted or replaced by a semiconductor device capable of conducting current bidirectionally (e.g. a MOSFET).

The power management section 29 can be configured to perform a regular shutdown process upon receipt of a system shutdown command signal. The regular shutdown process can be identical to the emergency shutdown process. Alternatively, the regular shutdown process can be fully sequential as shown in the right part of FIG. 2.

Figure 5:
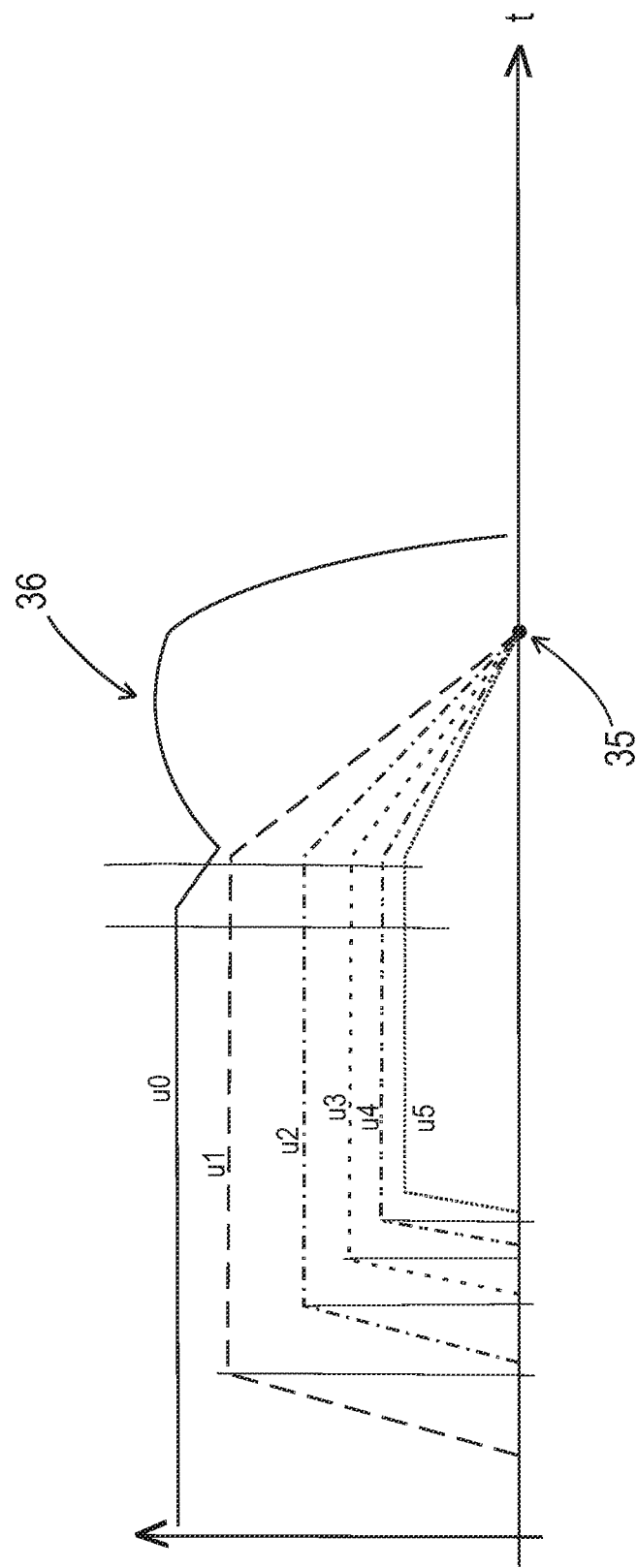
FIG. 5 illustrates an emergency shutdown process performed by a power supply unit of the microprocessor system according to FIG. 4.

As an alternative to the emergency shutdown process shown in FIG. 5, there can be provided a controlled decreasing of the lowest secondary voltage u5 down to the safety level 35, after that a controlled decreasing of the next higher secondary voltage u4 and according to this principle a decreasing of the remaining secondary voltages u3-u1. Such an emergency shutdown process is in principle sequential, but it is still faster than the regular shutdown process as shown in the right part of FIG. 2, because there is no need for safety time intervals. Due to the control, the maximum falling time can be accurately calculated and considered in the definition of the sequencing.

Another alternative to the emergency shutdown process shown in FIG. 5 is based on decreasing the secondary voltages gradually applying individual decrements. This embodiment is particularly suitable for digital power supply units. In particular, there can be a pre-programmed stepwise decreasing of the duty-cycles of DC-DC-converters. A feedback is not necessary. It is advantageous that the maximum falling time of the secondary voltage levels can be accurately calculated. Further, this method is easy to optimize, preferably on a fully logical basis.

The power supply unit 21 shown in FIG. 4 is not only suitable to supply a microprocessor 15, but any kind of integrated circuit requiring the supply of several different DC voltage levels.

The avoidance of a fixed progressive time sequence for turning off the secondary voltages significantly accelerates the shutdown process. At the same time, the reverse energy transfer provides an extended time margin for completing the safe system turnoff.

While this invention has been described in terms of the preferred embodiments thereof, it is not intended to be so limited, but rather only to the extent set forth in the claims that follow.

I claim:

1. A power supply unit for an electronic device, said power supply unit comprising:
    an input section comprising input terminals connectable to a primary power source, the primary power source outputting a primary voltage;
    an output section comprising output terminals connectable to the electronic device and a plurality of DC-DC converters configured to output at least two secondary voltages (u1-u5) having different nominal voltage levels; and
    a power management section configured to perform a shutdown process upon existence of a shutdown criterion by at least simultaneously starting to decrease, in a controlled manner, each of the secondary voltages (u1-u5) down to a predetermined safety level including by reducing respective duty cycles of the DC-DC converters and further by re-injecting current from the output section to a voltage sensor.

2. The power supply unit in accordance with claim 1, wherein:
    the power supply unit comprises a voltage supervisor section connected to the power management section;
    the voltage supervisor section being configured to detect a loss of the primary voltage and to output a power loss signal upon detecting the loss of the primary voltage; and
    the shutdown process is an emergency shutdown process to be performed by the power management section upon receipt of the power loss signal from the voltage supervisor section.

3. The power supply unit in accordance with claim 1, wherein the power management section is configured to decrease the secondary voltages (u1-u5) during the shutdown process such that, before the secondary voltages (u1-u5) have reached the safety level, the actual level of the secondary voltage having the higher nominal voltage level is always equal or greater than the actual level of the secondary voltage having the lower nominal voltage level.

4. The power supply unit in accordance with claim 1, wherein the power management section is configured to control the decrease of the secondary voltages (u1-u5) during the shutdown process according to respective predetermined temporal courses.

5. The power supply unit in accordance with claim 4, wherein the predetermined temporal courses are at least essentially linear courses.

6. The power supply unit in accordance with claim 1, wherein the power management section is configured to simultaneously decrease the secondary voltages (u1-u5) during the shutdown process such that they simultaneously reach the safety level.

7. The power supply unit in accordance with claim 1, wherein the power management section is configured to decrease, during the shutdown process, the secondary voltage having the lower nominal voltage down to the safety level after decreasing of the secondary voltage having the higher nominal voltage.

8. The power supply unit in accordance with claim 1, wherein the shutdown process comprises gradually decreasing the secondary voltages (u1-u5) applying individual decrements.

9. The power supply unit in accordance with claim 1, wherein the shutdown process comprises decreasing the secondary voltages (u1-u5) in a feedback-controlled manner.

10. The power supply unit in accordance with claim 1, wherein:
the power supply unit includes the plurality of DC-DC converters having respective energy storages in coils;
the power supply unit is configured to allow for a reverse energy transfer from the energy storages to the input section during the shutdown process; and
the power management section is configured to decrease the secondary voltages (u1-u5) sufficiently fast to allow for the reverse energy transfer from the energy storages to the input section.

11. The power supply unit in accordance with claim 1, wherein:
the power management section is configured to decrease the secondary voltages (u1-u5) during the shutdown process by means of a current injection at the output section.

12. The power supply unit in accordance with claim 1, wherein the safety level is greater than 0 mV and less than 200 mV.

13. A microprocessor system having a microprocessor and a power supply unit connected to the microprocessor, wherein the power supply unit includes:
an input section comprising input terminals connectable to a primary power source, the primary power source outputting a primary voltage;
a plurality of DC-DC converters having respective energy storages in coils;
an output section comprising output terminals connectable to the microprocessor and outputting at least two secondary voltages (u1-u5) having different nominal voltage levels; and
a power management section configured to upon existence of a shutdown criterion perform a shutdown process that enables a reverse energy transfer from the energy storages to the input section to simultaneously start to decrease, in a controlled manner, each of the secondary voltages (u1-u5) down to a predetermined safety level sufficiently fast to enable the reverse energy transfer from the energy storages to the input section.

14. The microprocessor system of claim 13, wherein:
the power management section is further configured to simultaneously decrease the secondary voltages (u1-u5) during the shutdown process such that the secondary voltages (u1-u5) simultaneously reach the safety level.

15. The microprocessor system of claim 13, wherein:
the power management section is further configured to:
re-inject current from an output section to a voltage sensor in order to decrease the secondary voltages (u1-u5) during the shutdown process.

16. The microprocessor system of claim 13, wherein:
the safety level is greater than 0 mV and less than 200 mV.

17. A system comprising:
an electronic device; and
a power supply unit for the electronic device, said power supply unit comprising:
an input section comprising input terminals connectable to a primary power source, the primary power source outputting a primary voltage;
an output section comprising output terminals connectable to the electronic device and a plurality of DC-DC converters configured to output at least two secondary voltages (u1-u5) having different nominal voltage levels; and
a power management section configured to perform a shutdown process upon existence of a shutdown criterion by at least simultaneously starting to decrease, in a controlled manner, each of the secondary voltages (u1-u5) down to a predetermined safety level including by reducing respective duty cycles of the DC-DC converters and further by re-injecting current from the output section to a voltage sensor.

18. The system of claim 17, wherein:
the power management section is further configured to simultaneously decrease the secondary voltages (u1-u5) during the shutdown process such that the secondary voltages (u1-u5) simultaneously reach the safety level.

19. The system of claim 17, wherein:
the power supply unit is configured to allow for a reverse energy transfer from the energy storages to the input section during the shutdown process;
the power supply unit includes the plurality of DC-DC converters having respective energy storages in coils; and
the power management section is further configured to decrease the secondary voltages (u1-u5) sufficiently fast to allow for the reverse energy transfer from the energy storages to the input section.

20. The system of claim 17, wherein:
the power supply unit comprises a voltage supervisor section connected to the power management section;
the voltage supervisor section being configured to detect a loss of the primary voltage and to output a power loss signal upon detecting the loss of the primary voltage; and
the shutdown process is an emergency shutdown process to be performed by the power management section upon receipt of the power loss signal from the voltage supervisor section.

* * * * *